United States Patent [19]
Seyerle

[11] Patent Number: 5,722,309
[45] Date of Patent: Mar. 3, 1998

[54] APPARATUS FOR CLAMPING THE END OF A RECIPROCATING SAW BLADE

[75] Inventor: Jorg Seyerle, Kongen, Germany

[73] Assignee: Metabowerke GmbH & Co., Nurtingen, Germany

[21] Appl. No.: 584,948

[22] Filed: Jan. 16, 1996

[30] Foreign Application Priority Data

Jan. 20, 1995 [DE] Germany ............... 195 01 635.1

[51] Int. Cl.⁶ .................................................. B27B 19/02
[52] U.S. Cl. ........................ 83/699.21; 30/392; 279/77
[58] Field of Search .......................... 83/699.21; 30/392, 30/393, 394; 279/76, 77, 79, 82, 904

[56] References Cited

U.S. PATENT DOCUMENTS

| | | | |
|---|---|---|---|
| 3,542,097 | 11/1970 | Dudek et al. ................ | 30/392 |
| 4,106,181 | 8/1978 | Mattchen ................ | 83/699.21 X |
| 4,601,477 | 7/1986 | Barrett et al. ................ | 30/394 X |
| 4,648,182 | 3/1987 | Hoffman ................ | 279/79 X |
| 5,322,302 | 6/1994 | Quirijnen ................ | 30/392 X |
| 5,443,276 | 8/1995 | Nasser et al. ................ | 30/392 X |

Primary Examiner—Eugenia Jones
Attorney, Agent, or Firm—Charles E. Baxley, Esq.

[57] ABSTRACT

An apparatus is provided for attachment of a saw blade to the plunger of a jigsaw. The apparatus includes a clamping body and a clamping member which includes a lever which has an eccentric surface which bears against the saw blade. A tension spring utilizes the mechanical advantage of the lever to provide increased holding force on the saw blade.

5 Claims, 2 Drawing Sheets

APPARATUS FOR CLAMPING THE END OF A RECIPROCATING SAW BLADE

BACKGROUND OF INVENTION

The present invention relates generally to the field of sawing equipment and, more particularly, to an apparatus for clamping the end of a reciprocating saw blade.

THE PRIOR ART

The prior art related to clamping devices for saw blades includes devices which are described in the following patents: DE 30 06 299 A1, U.S. Pat. No. 3,555,678 and EPO 582 326 A1.

In DE 30 06 299 A1, a clamping body is surrounded by a sleeve which is rotatable relative to a saw blade holder and has an eccentric curve on its inside. Supported on this eccentric curve is a clamping jaw, which is displaceable as a clamping member transversely to the saw blade holder by means of the eccentric curve by rotation of the sleeve. The application of an adequate clamping force for the saw blade is problematic in this clamping device. The clamping sleeve could for instance loosen, especially as a result of vibrations which occur during use and the saw blade could thus become detached.

In U.S. Pat. No. 3,555,678, a device is shown for clamping the end of a saw blade which is equipped with a double-armed lever. At least one pin is engaged in a positive locking manner in a corresponding recessed portion at the clamping end of the saw blade which sits on the shorter lever arm.

In EP 0 582 326 A1 there is disclosed a similar clamping device in which the clamping member is arranged on a pivotable body which can be firmly clamped in its clamping position by means of an actuating member guided in a slotted link.

In the foregoing known devices there is no provision for the clamping end of the saw blade to be acted upon directly by means of a frictionally engaged clamping member.

OBJECTS AND SUMMARY OF INVENTION

It is an object of the present invention to provide an apparatus for clamping the end of a reciprocating saw blade in which high clamping forces can be applied by hand in a simple manner and in which release of the saw blade during use is prevented by the application of high friction forces.

Another object of the present invention is to provide an apparatus for clamping the end of a reciprocating saw blade which does not require a tool of any kind for operation.

The foregoing and other objects and advantages of the present invention will appear more clearly hereinafter.

In accordance with the present invention there is provided an apparatus for clamping the end of a reciprocating saw blade which includes a double-armed lever. The mechanical advantage between the shorter inner arm and the longer outer arm of the lever enables high clamping forces to be applied via an eccentric curve formed on the lever which acts directly on the clamping end of the saw blade. As a result, the clamping device is self-locking and loosening of the saw blade does not occur. Curvature of the longer outer arm of the double-armed clamping lever in the peripheral direction of the clamping body avoids interfering projections even if a relatively thick saw blade is clamped and the curved outer arm of the clamping lever cannot be swung up close to the clamping body in the clamping position. Thus the apparatus according to the present invention enables a saw blade, such as the saw blade of a jigsaw, to be clamped without the need for a tool in an especially simple and effective manner.

The present invention further includes a tension spring which is connected to the lever and to the clamping body. The mechanical advantage of the lever amplifies the spring force of the tension spring which results in increased clamping force being exerted on the saw blade.

BRIEF DESCRIPTION OF THE DRAWINGS

Other important objects and advantages of the present invention will be apparent from the following detailed description of the invention, taken in conjunction with accompanying drawings in which.

DETAILED DESCRIPTION OF THE INVENTION

Figure 1:
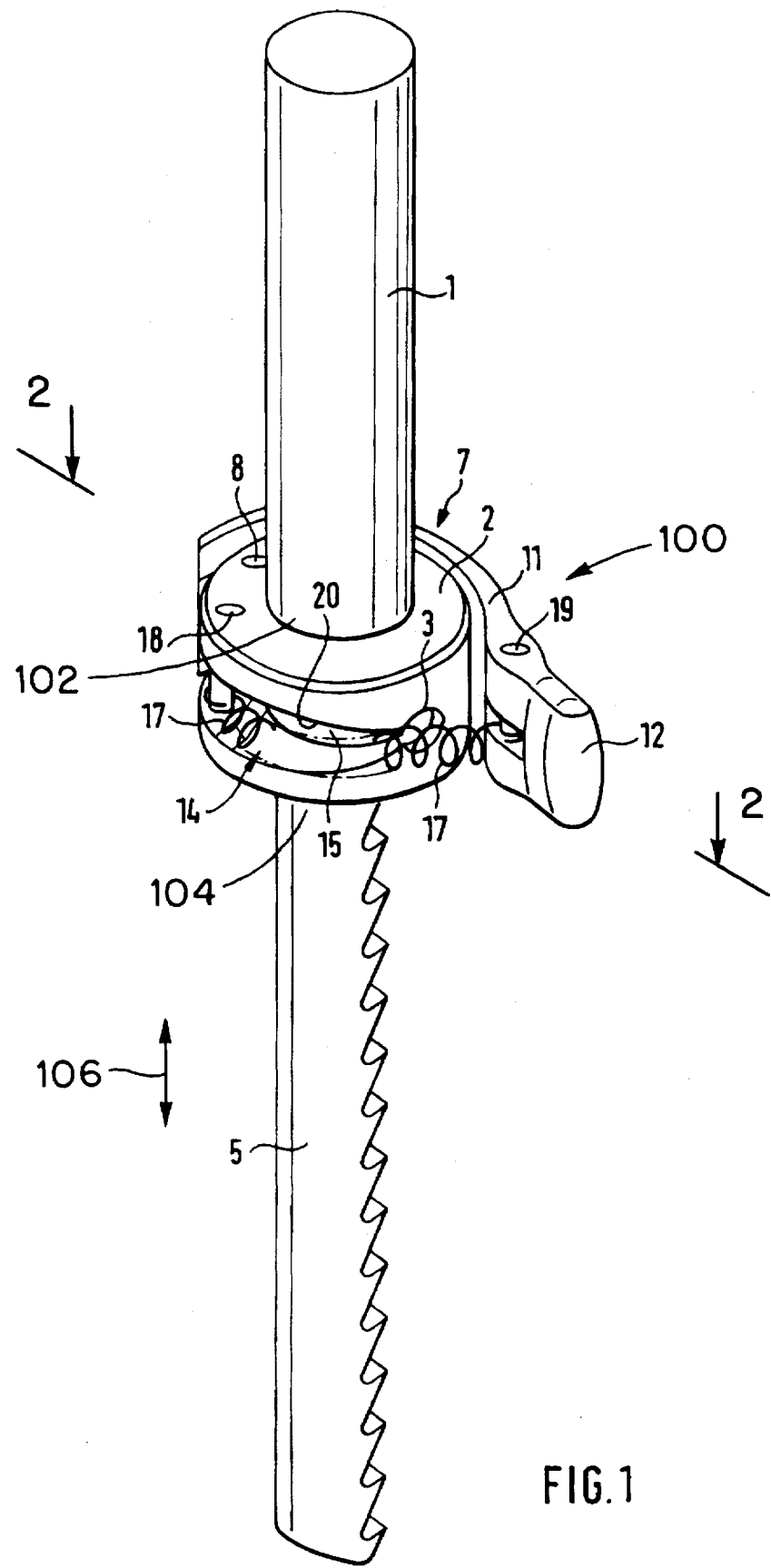
FIG. 1 is a perspective view of an apparatus for clamping the end of a reciprocating saw blade, made in accordance with the present invention.
Figure 2:
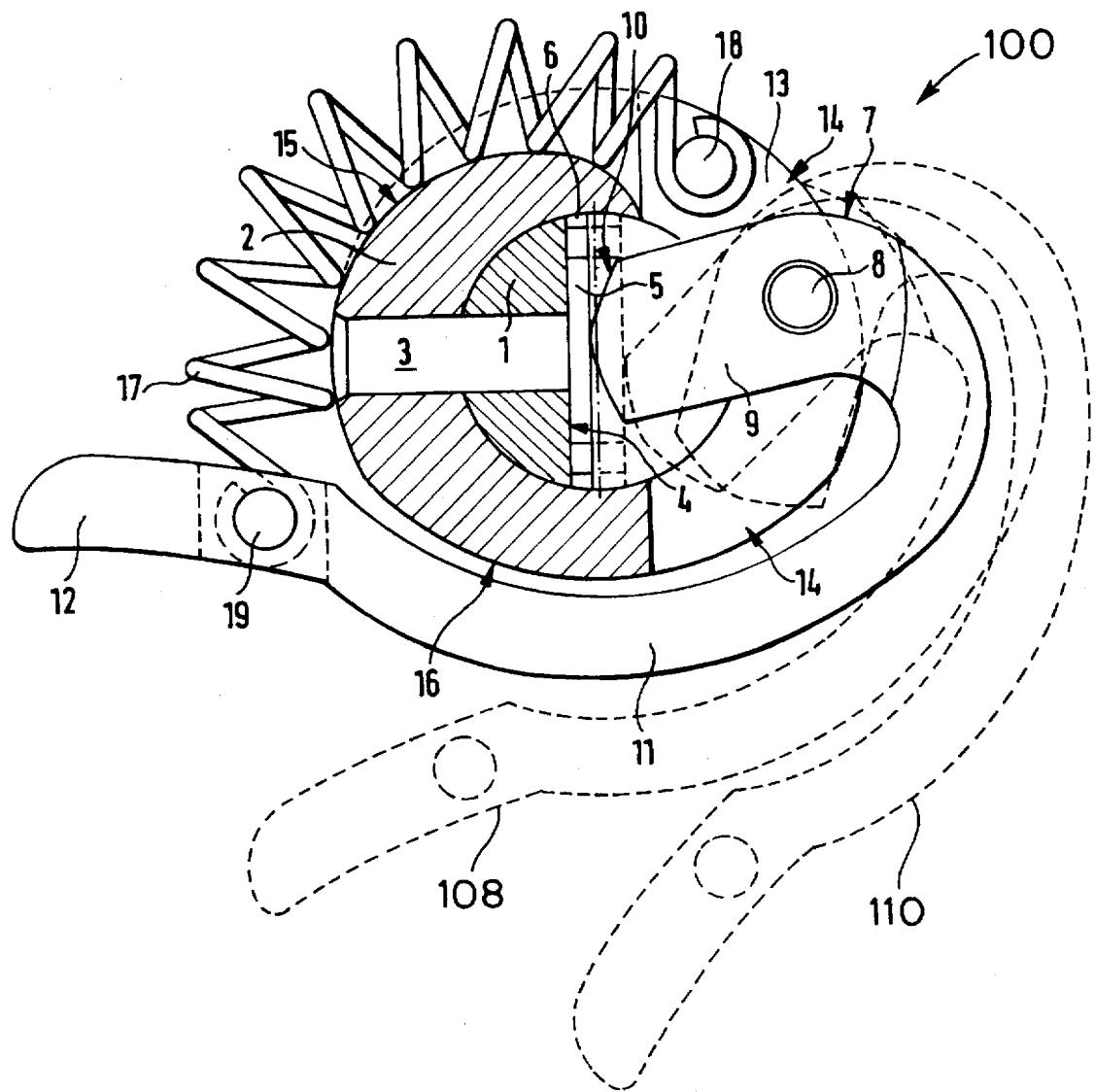
FIG. 2 is a cross-sectional view taken along line 2—2 of FIG. 1.

With reference to the drawings, wherein like reference numbers designate like or corresponding parts throughout, there is shown in FIGS. 1–2 an apparatus 100 for clamping the end of a reciprocating jigsaw blade 5, made in accordance with the present invention. FIG. 1 shows a plunger 1 of a jigsaw on a bottom end 102 of which there is mounted the apparatus 100.

The apparatus 100 can be tightened without the need for a tool to clamp an end 104 of the jigsaw blade 5 in a secure manner.

The apparatus 100 has a clamping body 2 connected to the plunger 1 by means of a clamping pin 3. The jigsaw blade 5 is fixed at the clamping end in the apparatus 100 in such a way that it lies essentially in the diametral plane of the plunger 1. The clamping body 2 has an outer surface 16 which is coaxial to the plunger 1.

As is shown in FIG. 2, a bearing surface 4 is formed on the plunger 1 approximately in a diametral plane of an outer surface 16 of the clamping body 2 and thus in the diametral plane of the plunger 1, against which bearing surface 4 the clamping end of the jigsaw blade 5 can be brought to bear. The saw blade 5 is moved by a lever 7 into engagement with a positive locking contoured member 6 which secures the jigsaw blade 5 to the plunger 1 in its stroke. In operation, the jigsaw blade 5 is restrained in its clamping position bearing against the bearing surface 4. The saw blade's stroke is indicated in FIG. 1 by reference number 106.

The clamped end 104 of the saw blade 5 is restrained against the bearing surface 4 by means of a clamping member in the form of the double-armed lever 7 which is mounted on a bearing pin forming a pivot 8. Pivot 8 of lever 7 is arranged at a distance from the bearing surface 4, parallel to the stroke axis or stroke direction 106. An inner arm 9 of the lever 7 extends from the pivot 8 into the interior of the clamping body 2, which inner arm 9 has an eccentric curve 10 at its inner end. By pivoting of the lever 7 about the pivot 8, its inner arm 9, with its eccentric curve 10, the eccentricity of which is relative to the pivot 8, can be brought to bear against the clamping end of the saw blade 5. Restraint is thus obtained between the pivot 8 and the bearing surface 4 by means of the inner arm 9 and the clamped end 104 of the saw blade 5, the force of which restraint locks via the clamping body 2.

The lever 7 has an outer arm 11, the effective length of which is substantially greater than that of the inner arm 9 of the lever 7. The outer arm 11 runs with greater curvature directly from the pivot 8 to the outside and, following the greater curvature, the outer arm 11 assumes a curved shape which is adapted to the outer rounded portion of the clamping body 2. When clamping a thicker saw blade, the lever 7 occupies the position which, in FIG. 2, corresponds to the inner representation in broken lines 108. The open position of the lever 7, in which the shorter inner arm 9 is swung away from the bearing surface 4 to such an extent that the saw blade 5 can be exchanged, is indicated in FIG. 2 by the outer representation in broken lines 110.

The lever 7 is roughly "C"-shaped overall and has a free gripping end 12 which is angled slightly to the outside in the opposite direction to the C-curvature, and thus the gripping end 12 can be grasped easily by a user even in the position in which it almost bears against the clamping body 2.

As FIG. 1 clearly shows, the clamping body 2 has a recess 14 running peripherally thereabout and formed symmetrically to its central cross-sectional plane, flanks of which recess 14 are formed in a deeper end area by radial surfaces 13. The part of lever 7 plunging into the clamping body 2, in particular its shorter inner arm 9, is arranged between the two opposite radial surfaces 13 in the recess 14, the pivot 8 for the lever 7 bridging the recess 14.

The groove-shaped recess 14, extending approximately over half the periphery of the clamping body 2, has an inclined base 15 outside the pivoting area of the lever 7, which inclined base 15 gradually rises from the deepest point up to the peripheral side of the clamping body 2. A tension spring 17 is arranged in the recess 14. The spring 17 is arranged peripherally relative to the clamping body 2 remote from the longer outer arm 11. The tension spring 17 is fastened with its inner end to a pin 18 which is adjacent to the pivot 8.

The spring 17, which follows the rising base 15 of recess 14 from this point on, is linked at its other end to the outer arm 11 of the lever 7 close to the gripping end 12 by virtue of the fact that it is likewise hooked into a pin 19 at this location. The tension spring 17 urges the lever 7 in the clamping position and it thus assists the clamping force with the mechanical advantage of the longer outer arm 11 versus the shorter inner arm 9 of the lever 7. The tension spring 17 provides additional security, especially when vibrations occur during operation.

In addition, the tension spring 17 does not impair the mobility of the lever 7, because the spring 17 is arranged peripherally relative to the clamping body 2 remote from the outer arm 11 of the lever 7.

The foregoing specific embodiment of the present invention as set forth in the specification herein is for illustrative purposes only. Various deviations and modifications may be made within the spirit and scope of this invention, without departing from the main theme thereof.

I claim:

1. An apparatus for clamping a saw blade to a reciprocable plunger, the apparatus comprising:

a clamping body connected to an end of the plunger, with said clamping body having a bearing surface arranged for positive engagement with the saw blade, and with said clamping body having a stroke axis;

a clamping member, with said clamping member pivotally mounted on said clamping body, with said clamping member comprising:

a lever member, with said lever member having a relatively shorter inner arm and a relatively longer outer arm; and an eccentric curved surface means with said eccentric curved surface means formed on said relatively shorter inner arm;

in which said clamping body further comprises spring means and an outer surface, with said spring means acting on said lever member urging said lever member toward a clamping direction in which said relatively shorter inner arm is urged toward said bearing surface;

and in which said spring means comprises tension spring means having a first end, a second end and an intermediate portion, with said first end connected to said clamping body and with said second end connected to said lever member and with said intermediate portion of said tension spring means extending onto said outer surface of said clamping body.

2. The apparatus according to claim 1, in which said outer surface defines a recessed portion, said tension spring means projects into said recessed portion.

3. The apparatus as claimed in claim 1, with said clamping body being generally shaped as a cylinder and said bearing surface disposed in a diametral plane of said cylinder, said lever member mounted on said clamping body generally opposite said bearing surface.

4. The apparatus as claimed in claim 3, further comprising a pivot member, pivotally supporting said lever member with said pivot member, having an axis disposed generally parallel to said stroke axis of said clamping body.

5. The apparatus as claimed in claim 1, in which said lever member has a shape generally similar to a letter "C".

* * * * *